United States Patent
Hacker

(10) Patent No.: US 6,776,813 B2
(45) Date of Patent: Aug. 17, 2004

(54) DEVICE FOR LIQUID SEPARATION AND FILTRATION OF COMPRESSED GASES

(75) Inventor: Stefan Hacker, Stockdorf (DE)

(73) Assignee: Bauer Kompressoren GmbH, Munich (DE)

( * ) Notice: Subject to any disclaimer, the term of this patent is extended or adjusted under 35 U.S.C. 154(b) by 21 days.

(21) Appl. No.: 10/345,391

(22) Filed: Jan. 16, 2003

(65) Prior Publication Data

US 2003/0154699 A1 Aug. 21, 2003

(30) Foreign Application Priority Data

Jan. 16, 2002 (DE) .......................................... 102 01 486

(51) Int. Cl.$^7$ .......................... B01D 45/12; B01D 50/00
(52) U.S. Cl. ........................ 55/337; 55/423; 55/DIG. 17
(58) Field of Search .......................... 55/337, 423, 456, 55/457, DIG. 17

(56) References Cited

U.S. PATENT DOCUMENTS

| | | | | |
|---|---|---|---|---|
| 3,859,063 A | * | 1/1975 | Porter et al. .................. | 96/297 |
| 4,227,898 A | * | 10/1980 | Kamekawa et al. .......... | 96/386 |
| 4,361,425 A | * | 11/1982 | Hata ........................... | 96/140 |
| 4,872,890 A | * | 10/1989 | Lamprecht et al. ............ | 55/323 |
| 5,484,474 A | * | 1/1996 | Weinstein et al. ............. | 96/209 |
| 5,676,717 A | * | 10/1997 | Cope et al. ................... | 55/321 |
| 5,961,675 A | * | 10/1999 | Son et al. ..................... | 55/307 |
| 6,019,822 A |   | 2/2000 | Kanzawa et al. ................ | 96/8 |
| 6,197,096 B1 | * | 3/2001 | Cartellone ..................... | 96/55 |
| 6,238,451 B1 | * | 5/2001 | Conrad et al. ................ | 55/323 |
| 6,485,535 B1 | * | 11/2002 | Linnersten et al. ........... | 55/319 |

FOREIGN PATENT DOCUMENTS

| | | | |
|---|---|---|---|
| DE | 37 35 106 A1 | 4/1989 | |
| GB | 2064359 | * 6/1981 | .................. 55/337 |
| GB | 2 221 168 A | 1/1990 | |

* cited by examiner

*Primary Examiner*—Richard L. Chiesa
(74) *Attorney, Agent, or Firm*—Nixon Peabody LLP; David S. Safran

(57) ABSTRACT

A device for liquid separation for drying and cleaning of compressed gases, which is intended, especially, for compressed air and breathing air, and in which the design is such that a centrifugal liquid separator is located axially upstream of a filter with a filter cartridge in the tank of the device. In the interior of the tank there is the centrifugal liquid separator with an assigned separation space and a condensate liquid collection space axially underneath the filter cartridge of the filter. The bottom of the filter cartridge can form the boundary wall of the separation space of the centrifugal liquid separator. Between the outside wall of the filter cartridge of the filter and the inside wall of the tank there is a narrow gap in which the compressed gas, after leaving the centrifugal liquid separator, rises high along the filter cartridge as far as the opposite entry into the filter. In this area, further post-separation or fine separation can take place. The axially successively connected arrangement of the centrifugal liquid separator and the filter allows a reduction in the diameter of the device and the overall arrangement leads to better operating reliability and to an improved degree of liquid separation.

15 Claims, 1 Drawing Sheet

DEVICE FOR LIQUID SEPARATION AND FILTRATION OF COMPRESSED GASES

BACKGROUND OF THE INVENTION

1. Field of the Invention

The invention relates to a device for liquid separation and filtration of compressed gases, especially compressed air, nitrogen, rare gases, natural gases or the like, filtration being used for drying and cleaning of the compressed gas. In particular one such device is of great importance in the production of compressed breathing air.

2. Description of Related Art

There is already a device for liquid separation and filtration for drying and cleaning of compressed gases which has a tank which is closed on the bottom and top, within which, concentrically to one another, there are a liquid separation means and a filter means which is designed preferably in the form of a filter cartridge. In the outer concentric annular space, there is a liquid separation means which works according to the centrifugal principle and which comprises a separation space and a condensate collection space, and which is physically, but not fluidically, separated by means of a separating wall relative to the concentrically inside filter means in the form of a filter cartridge. In this device, the compressed gas first enters the centrifugal liquid separation means in which liquid is separated, for example, in droplet form, from the gas flow and then is captured in the condensate collection space. The exit side of the liquid separation means is connected by flow communications to the downstream filter means for drying and cleaning, the separating wall between the concentrically outside liquid separation means and the concentrically inside filter means causing flow deflection.

If, in this known device, the separating wall between the concentrically arranged liquid separation means and the filter means begins to leak, the liquid separated by the liquid separation means can travel into the downstream filter means; this adversely affects the operating reliability of such a device. Furthermore, the known device has a relatively large diameter since the inside filter means is located concentrically outward of the liquid separation means with the interposition of a separating wall so that such a device takes up a relatively large amount of installation space.

SUMMARY OF THE INVENTION

The primary object of the present invention is, therefore, to provide a device for liquid separation and filtration for drying and cleaning of compressed gases which, while surmounting the above described difficulties, has a structure that is as compact as possible, which works reliably and especially also accomplishes an improved degree of liquid separation.

According to the invention, a device for liquid separation and filtration for drying and cleaning of compressed gases, especially compressed air, with a tank closed on the top and bottom, is provided, within which a centrifugal liquid separation means with a separation space and a condensate collection space, and a filter means, preferably in the form of a filter cartridge, are located with communicating flow such that the compressed gas is fed into the tank through the liquid separation means, then through the filter means, and the compressed gas which has been cleaned and dried in this way, passes to the outlet of the tank which is characterized in that the tank is made in the form of a continuous hollow cylinder, the liquid separation means being axially upstream of the filter means in the form of a filter cartridge in a common tank, and the filter cartridge being positioned leaving a small annular gap to the inside wall of the common tank which is in communications with the outlet side of the liquid separation means.

In the design of the device in accordance with the invention, the diameter of the device can thus be greatly reduced so that the device takes up reduced installation space and even with constricted space conditions can be accommodated without difficulties.

In the design of the device in accordance with the invention this is achieved especially by the liquid separation means with the separation space and the condensate collection space being located in the common tank horizontally in a separate area axially in terms of flow in front of the filter means. In this way, a separate separating wall between the liquid separation means and the filter means can be omitted since the filter means, which is preferably designed in the form of a filter cartridge, especially with its bottom, directly forms the spatial separation relative to the axially upstream liquid separation means. Therefore, in the device in accordance with the invention the operating reliability can also be increased since the danger of leak formation in a separating wall is eliminated.

Since, due to the axially successive arrangement of the liquid separation means and the filter means, the compressed gas leaving the liquid separation means must also traverse a further path along the filter means as far as the inlet into it, this area can be used as a fine separation means since the compressed gas which is flowing in a spiral on this route to the entry into the filter means strikes the cooler tank wall, and in this way, further fine separation or post-separation can take place up to the inlet into the filter means. As a result, therefore, the degree of liquid separation can be further increased.

Furthermore, the filter cartridge of the filter means is located in the tank interior, leaving a small annular gap to the inside wall of the housing, the annular gap being in communication with the outlet side of the liquid separation means. In this small and narrow annular gap, the compressed gas leaving the liquid separation means is accelerated. The narrowness of the gap increases the turbulence of the flow. This improves condensate separation on the filter cartridge wall and on the cooler inside wall of the tank so that, on this path to the inlet into the filter means, further post-separation or fine separation of liquid can take place. Therefore, the device in accordance with the invention has an extremely favorable degree of liquid separation.

Preferably, the device in accordance with the invention is designed such that the compressed gas, in the area of the bottom of the tank, enters the separation space of the liquid separation means, and the condensate collection space is formed in interaction with the bottom of the tank. Therefore, only the bottom area of the tank need be made accordingly, such that, at the lowest possible point, there is the condensate collection space in which the liquid portion which has been separated by means of the liquid separation means is collected. This yields a device which is designed to be as compact as possible and easy to produce, especially also in the centrifugal liquid separation area.

Expediently, the device in accordance with the invention is designed such that the bottom of the filter cartridge, which is located axially downstream, directly borders the separation space of the liquid separation means. Therefore, for spacial and physical separation of the separation space and the filter means, separate additional means are not necessary, but the bottom of the filter cartridge is used itself as one of the boundary walls of the separation space of the liquid separation means. This greatly simplifies the structure of the device in accordance with the invention, especially in terms of construction and production engineering.

Alternatively, underneath the filter cartridge, in the common tank, there can be a separating wall which can be provided in addition for delineating the separation space.

According to one preferred embodiment in accordance with the invention, the design is such that the compressed gas enters via an inlet tube which projects into the separation space of the liquid separation means which is located axially underneath the filter cartridge, and has at least one exit opening in the vicinity of its upper end. In the approach in accordance with the invention, an axially relatively short inlet tube for the compressed gas is thus sufficient, and the separation space is formed and bounded directly by the bottom part of the housing and by the inside wall of the housing. In this design, especially the condensate collection space is formed by the lower area of the separation space which also has an axial distance relative to the bottom of the filter cartridge from the outlet in the bottom area of the filter cartridge so that the result with reliable operation is that the condensate in the condensate collection space cannot travel back again into the gas flow which has passed through the filter cartridge of the filter means, and which then emerges on the bottom side of the tank. In this way, remixing with the cleaned and dried compressed gas flow can be effectively avoided.

In summary, it is important in the invention that the liquid separation means and the filter means for drying and clearing the compressed gases be spatially located axially in succession and that the filter means is located axially over the centrifugal liquid separation means without any additional separating walls, especially a narrow annular gap being formed between the outside wall of the filter cartridge of the filter means and the inside wall of the housing which enables post-separation or fine separation of the liquid.

The invention is explained in detail below with reference to one preferred embodiment and the attached drawings.

BRIEF DESCRIPTION OF THE DRAWINGS

The sole FIG. 1 of the drawings schematically shows an axial sectional view of the device for liquid separation and filtration for drying and cleaning of compressed gases in accordance with the invention.

DETAILED DESCRIPTION OF THE INVENTION

Figure 1:
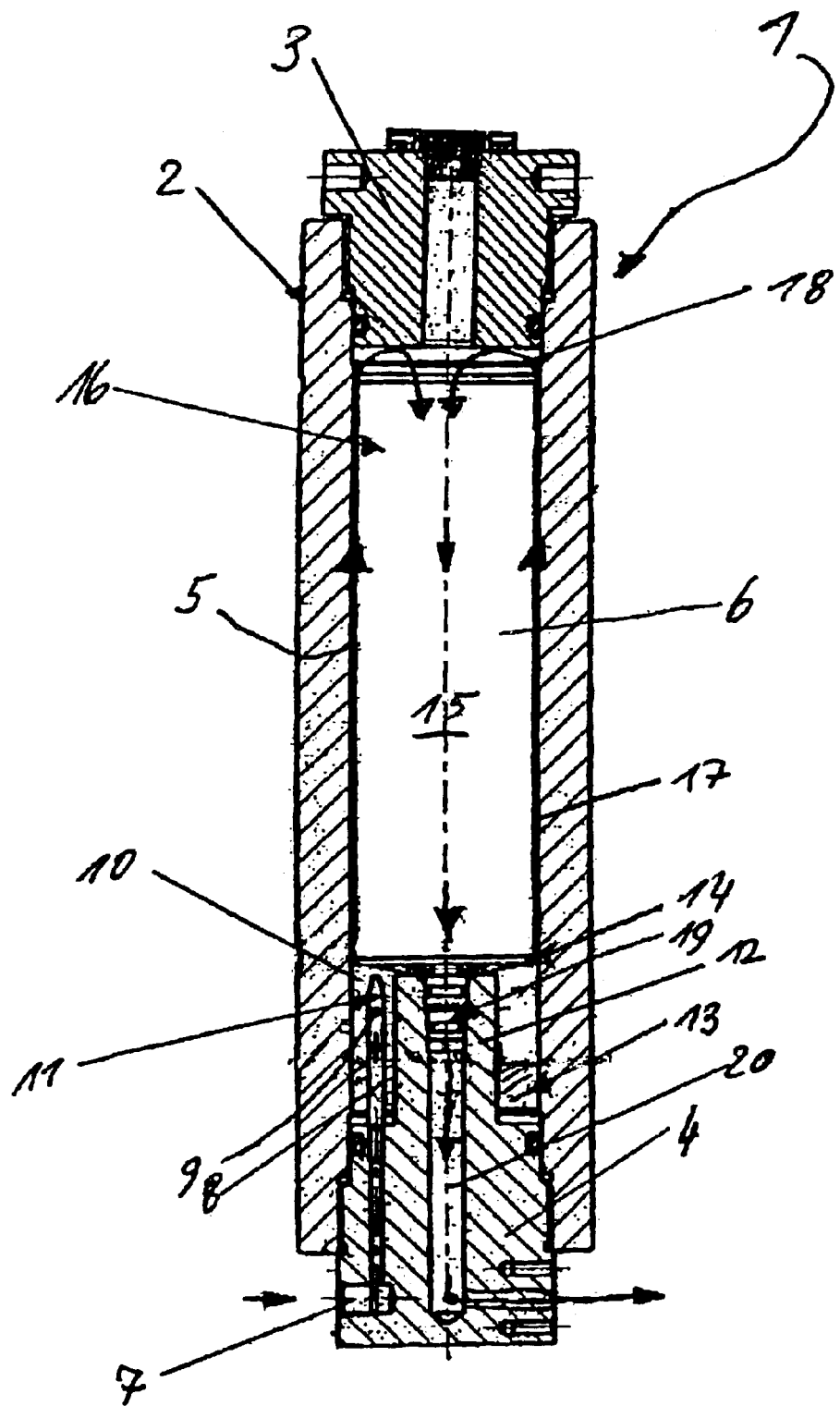

The preferred embodiment described below is intended to be representative of the many possible embodiments and the invention should not be viewed as being limited thereto.

In the sole FIG. 1, the device for liquid separation and filtration for drying and cleaning of compressed gases is indicated as a whole by reference number 1. Compressed gases can be especially compressed air, but can also be other gases, such as nitrogen, rare gases, natural gas or the like. One preferred application of the device 1 is in the area of making available pressurized breathing air. In this application, especially, all harmful components of the compressed air must be precipitated and removed since otherwise there could be a health hazard. During the conditioning process of compressed air or other compressed gases, especially in compressor assemblies, oil and other substances mix with the compressed gas, and thus, must be carefully removed from the compressed air.

The device of the invention has a tank 2 which is made preferably in the form of a hollow cylinder. The tank 2 is closed on the top by means of a cover 3 and on its axially opposite end by means of a bottom part 4. The inside wall 5 of the tank, in conjunction with the cover 3 and the bottom part 4, delineates the interior 6 of the tank. An inlet 7 is provided for the compressed gas; the gas originates, for example, from a compressor (not shown). The compressed gas which enters via the inlet 7 is input through a channel in the bottom part 4 via an entry tube 8 which has at least one exit opening 9 on its upper end. The inlet tube 8 projects into the separation space 10 of the centrifugal liquid separation means 11 which is surrounded by the part 12 of the bottom part 4, the part 12 which projects like a peg, and the inside wall 5 of the tank. The lower area of the separation space 10 forms a condensate collection space 13 in which the liquid, such as oil and water, separated from the compressed gas flow, collects. The top of the separation space 10 is formed directly by a bottom 14 of the filter cartridge 15 of the filter means 16 for drying and cleaning the compressed gas. Axially above the liquid separation means 11, or axially directly bordering the separation space 10, in the interior 6 of the tank, the filter means 16 is located downstream of the centrifugal liquid separation means 11 and encompasses the filter cartridge 15. The filter cartridge 15 is located in the tank interior 6 such that a small or narrow annular gap 17 remains free between the inside wall 5 of the tank and the outside wall of the filter cartridge 15. The compressed gas leaving the centrifugal liquid separation means 11 on the outlet side flows through this narrow annular gap 17 along the filter cartridge 15 and then, on the front 18, opposite the bottom 14, enters the filter cartridge 15, as represented by the arrows in the figure. The cover 3 of the tank 2 is inserted such that there is an intermediate space between the end surface of the cover 3 in the tank interior 6 and the entry side or the front 18 of the filter means 16 for flow deflection. After passing through the filter cartridge 15, the compressed gas emerges via an outlet 19 and is then branched off via a connecting channel 20 in the bottom part 4 of the tank 2 toward the outside. The outlet 19 of the filter means 16, in the preferred embodiment shown, is higher than the liquid level in the condensate collection space 13.

Thus, solely the construction of the device 1 in accordance with the invention ensures that the condensate in the condensate collection space 13 can no longer mix with the gas flow which leaves the filter means 16 via the outlet 19.

Although it is not shown in detail, the condensate collection space 13 can be connected to a drain means (not shown) so that the condensate collection space 13 can be emptied from time to time.

Thus, in the device 1 in accordance with the invention, the centrifugal liquid separation means 11 and the filter means 16 are located axially in succession in the tank interior 6. The bottom 14 of the filter cartridge 15 is used directly for separation between the separation space 10 and the filter means 16. Thus, in the device 1 of the invention, its diameter is determined by the diameter of the filter cartridge 15 of the filter means 16 and the thickness of the housing wall of the tank 2. The wall thickness of the tank 2 is determined by the pressure loads in the tank interior 6. In this way, in accordance with the invention, a device is obtained which is optimized and minimized with respect to its maximum diameter.

Furthermore, since additional means in the tank interior 6, for example, for separation of the separating space 10 and the filter means 16, are not necessary either, the tank interior 6 can also be optimally used for the operating purpose of the device 1 according to the invention. Structural simplifications also arise since additional installation parts in the device 1 as claimed in the invention can be abandoned.

How the device 1 works for liquid separation and filtering for drying and cleaning of compressed gas are explained in detail below.

As is shown with flow arrows in the sole figure, the compressed gas, for example, originating from a compressor, enters the inlet tube 8 via an inlet 7 in the bottom part 4 of the tank 2; this tube projects into the separation space 10 of the centrifugal liquid separation means 11. This compressed gas is loaded with liquid, such as water or the like, and emerges via the outlet opening 9 on the end of the inlet tube 8 and is routed essentially horizontally and tangentially against the opposing inside wall 5 of the tank. Thus, the centrifugal liquid separation means 11 in the separation space separates the liquid from the compressed gas flow and the liquid collects as condensate in the condensate collection space 13. The compressed gas flow leaves the centrifugal liquid separation means 11 in the direction of the narrow annular gap 17 between the inside wall 5 of the tank and the filter cartridge 15 of the axially downstream filter means 16. In this narrow annular gap 17, the compressed gas flow is accelerated and rises in the form of a spiral flow toward the front or inlet side 18 of the filter means 16. In the area of the narrow annular gap 17 further post-separation or fine separation of the liquid contained in the compressed gas flow takes place. The liquid which has been separated in the area of the narrow annular gap 17 runs down on the inside wall 5 of the tank and reaches the condensate collection space 13. After leaving the annular gap 17, the compressed gas flow is deflected by the front of the cover 3 in the axial direction and enters the filter cartridge 15 of the filter means 16 via the front 18. In the filter cartridge 15 further cleaning and drying of the compressed gas take place in the conventional manner. After passing through the filter cartridge 15, the compressed gas flow emerges via the outlet 19 from the filter means 16 which lies above the liquid level in the condensate collection space 13. The compressed gas is then branched off via a connecting channel 20 from the device 1 as compressed gas which has been fully treated.

Of course the invention, is not limited to the above described details of the preferred embodiment, but numerous changes and modifications are possible which one skilled in the art will make if necessary, without departing from the inventive idea.

What is claimed is:

1. Liquid separation and filtration device for drying and cleaning of compressed gases, comprising:
   a hollow, cylindrical tank which is closed on the top and bottom, and which has an inlet and an outlet,
   filter means in an interior space of said cylindrical tank, said filter means being in the form of a filter cartridge and being positioned with an annular gap being formed between the filter means and an inside wall of the cylindrical tank,
   a centrifugal liquid separation means with a separation space, said separation means being positioned in the interior space of the tank axially upstream of the filter means, with an annular gap being formed between the liquid separation means and the inside wall of the cylindrical tank, and with an outlet side of said liquid separation means being in fluid communication with an inlet side of said filter means, and
   a condensate collection space in said tank in communication with said separation means,
   wherein a flow path is provided for compressed gas fed into the inlet of the tank, through the liquid separation means, then through the filter means, and for compressed gas which has been cleaned and dried from an outlet side of the filter means to the outlet of the tank.

2. Device as claimed in claim 1, wherein compressed gas from the inlet of the tank is able to enter the separation space of the liquid separation means in an area of the bottom of the tank, and wherein the condensate collection space is formed by the liquid separation means in interaction with the bottom of the tank.

3. Device as claimed in claim 1, wherein a bottom of the filter cartridge which is located axially downstream borders the separation space of the liquid separation means.

4. Device as claimed in claim 1, wherein the inlet of the tank comprises an inlet tube which projects into the separation space of the liquid separation means and which has at least one exit opening in the vicinity of an upper end thereof.

5. Device as claimed in claim 1, wherein the condensate collection space forms a lower area of the separation space.

6. Device as claimed in claim 1, wherein the outlet side of the filter means is located spaced axially apart from the condensate collection space.

7. Device as claimed in claim 1, wherein the separation space is bordered by a separating wall which is located in the tank underneath the filter cartridge.

8. Device as claimed in claim 2, wherein a bottom of the filter cartridge which is located axially downstream borders the separation space of the liquid separation means.

9. Device as claimed in claim 8, wherein the inlet of the tank comprises an inlet tube which projects into the separation space of the liquid separation means and which has at least one exit opening in the vicinity of an upper end thereof.

10. Device as claimed in claim 9, wherein the condensate collection space forms a lower area of the separation space.

11. Device as claimed in claim 10, wherein the outlet side of the filter means is located spaced axially apart from the condensate collection space.

12. Device as claimed in claim 2, wherein the separation space is bordered by a separating wall which is located in the tank underneath the filter cartridge.

13. Device as claimed in claim 12, wherein the inlet of the tank comprises an inlet tube which projects into the separation space of the liquid separation means and which has at least one exit opening in the vicinity of an upper end thereof.

14. Device as claimed in claim 13, wherein the condensate collection space forms a lower area of the separation space.

15. Device as claimed in claim 14, wherein the outlet side of the filter means is located spaced axially apart from the condensate collection space.

* * * * *